United States Patent

[11] 3,534,830

[72] Inventor Martti M. Kaila
Helsinki, Finland
[21] Appl. No. 680,845
[22] Filed Nov. 6, 1967
[45] Patented Oct. 20, 1970
[73] Assignee Oy Wartsila Ab
Helsinki, Finland

[54] THROTTLING MEANS
6 Claims, 1 Drawing Fig.

[52] U.S. Cl. ........................................... 181/36,
137/436, 137/444
[51] Int. Cl. ........................................... F01n 1/12,
F16k 47/02
[50] Field of Search .................................. 137/436,
442, 444; 181/66, 67, 36, 33.9; 138/37, 40, 42;
251/120

[56] References Cited
UNITED STATES PATENTS
1,497,796  6/1924  Sherwood ............... 137/444X
2,105,314  1/1938  Duncan et al. .......... 137/444X
2,619,122  11/1952  Hunter ................... 137/436X Primary Examiner—William F. O'Dea
Assistant Examiner—David R. Matthews
Attorney—Waters, Roditi, Schwartz and Nissen ABSTRACT: A throttling device for a water closet comprises a tube enclosing a core of soft, sound absorbing material, the tube and core forming a helical duct therebetween, the core providing short extensions for the duct at opposite ends of the tube, which extensions gradually increase in cross-sectional areas in an axial direction away from the helical duct.

Patented Oct. 20, 1970　　　3,534,830
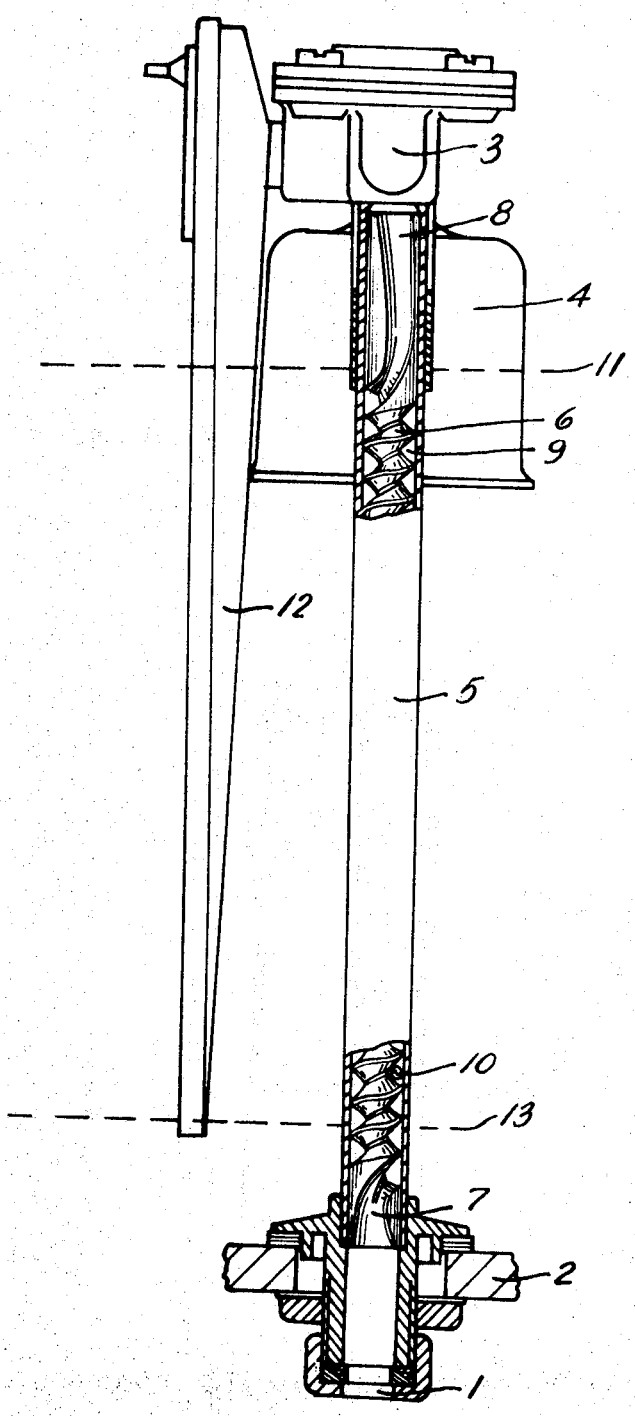

THROTTLING MEANS

The present invention relates to a throttling means and more particularly to a throttling means to be used in the flush water supply system of a water closet. Conventional water closets are rather noisy during the refilling of the flush water container. Also in other fluid flow systems there is often a need for a throttling means which operates without causing disturbing noise. Several attempts have been made to construct substantially noiseless throttling means, but they have not proven to be very successful, especially as regards their form and dimensions.

An object of the invention is to provide a noiseless throttling means which has low manufacturing costs, is easy to connect to ordinary fluid flow systems, especially water pipe systems, and is easy to keep clean from dirt and particles occuring in the water.

A further object of the invention is to provide a throttling means in combination with the valves and pipes of the flush water supply system of a water closet in which system most of the throttling takes part in the throttling means and very little in the other parts of the system.

A throttling means according to the invention comprises a tube enclosing a core member of soft sound absorbing material, said core member forming between itself and said tube a helical duct, said duct having short extensions at both ends of the core member, said extensions having an axial length of not more than 50 per cent of the axial length of said helical duct, said extensions forming substantially axially extending duct parts, the cross-sectional areas of which gradually increase in axial direction away from said helical duct. The throttling takes place mainly in the helical part of the duct. The object of the extensions is only to avoid noisy flow disturbances caused by discontinuities in the form of the duct. It is therefore essential that the helical duct constitute the main part of the throttling means. By giving the duct a helical form, a long flow duct can be obtained within a limited space. In the helical duct the flow of the passing fluid is braked due to the friction between the flowing medium and the walls of the duct. This means that a substantial part of the kinetic flow energy is converted directly into heat without causing turbulence resulting in disturbing noise. The helical form of the duct also causes a secondary flow in the form of a rotating movement of the fluid in the duct. This secondary flow is braked because the flow duct has a polygonal cross section, preferably a triangular cross section. The triangular cross section also provides a relatively great frictional surface compared to the cross-sectional area of the duct. The great frictional surface brakes both the main flow and the secondary flow. In this way a relatively effective throttling is obtained in the throttling means according to the invention without causing disturbing noise.

In a helical flow duct with a small diameter of the helix, the secondary flow is more intense than in a helical duct with greater diameter. Accordingly, it is an essential feature of the invention that the diameter of the helix is relatively small. Preferably the axial length of the helical duct should be at least five times the inner diameter of the surrounding tube.

In the following the invention will be described more fully with reference to the accompanying drawing the sole FIG. of which shows, partly in section, the flush water supply system of a water closet provided with a throttling means according to the invention.

In the drawing, 1 indicates the feed pipe of the flush water system of a water closet. The flush water container is indicated by 2, and the lowest water level in the container by 13. In the container 2 there is a water level operated valve 3 of the type well known in water closets. The valve can, for instance as in the illustrated embodiment, be automatically operated by a float 4 attached to the end of a control arm.

From the tube 1, the water enters into a throttling means according to the invention and comprising an outer tube 5 and an inner core member 6. The core member 6 has a short inlet part 7, and a somewhat longer outlet part 8. The main part of the core member 6 has the general form of a screw, which forms between itself and the outer tube 5 a helical duct 9 with a substantially triangular cross section. In the inlet and outlet parts 7 and 8, respectively, the duct has a substantially axial extension and a cross-sectional area which gradually increases in axial direction away from the helical duct. The axial extension of the duct in parts 7 and 8 is formed by external grooves in said parts, said grooves gradually increasing in cross-sectional area in axial direction away from duct 9 as shown. In the illustrated embodiment, the outlet part 8 has an axial length which is only about a fifth of the axial length of the helical duct. The inlet part 7 is still shorter.

The inner diameter of the tube 5 of the throttling means can be kept rather small, usually about one fourth to three fourths inches. The axial length of the helical duct is at least five times greater, in the illustrated embodiment more than 10 times greater.

The core member 6 can be made of plastic or rubber or any other suitable relatively soft material with a good ability of dissipating sound oscillations. Due to the helical form of the duct there is a secondary flow in the duct indicated by means of arrows 10. The potential energy of the water in the feed pipe 1 is transformed into frictional losses and secondary flow of the type indicated, without causing substantial noise.

From the throttling means the water enters the valve 3. The valve 3 automatically opens when the water level during the flushing of the toilet sinks from its upper level indicated at 11. When the valve opens, water flows through the pipe 1, the throttling means 5—9, the valve 3 and an outlet tube 12 into the flush water container 2. When the water level in the container again reaches the level 11, the valve 3 closes automatically. The outlet pipe 12 ends below the lowest water level 13. By this means no splashing of the filling water is heard.

The invention is not limited to the illustrated embodiment, and variations and modifications are feasible within the scope of the invention.

I claim:

1. A throttling means comprising a tube, a core member of soft, sound absorbing material in said tube, said core member forming between itself and said tube a helical duct, said duct having short extensions at both ends of said core member, said extensions having an axial length of not more than 50 per cent of the axial length of the helical duct, said extensions being formed as substantially axially extending grooves in said core member, the cross-sectional areas of which grooves gradually increase in axial direction away from said helical duct.

2. A throttling means according to claim 1, wherein said helical duct has substantially triangular cross section.

3. A throttling means according to claim 1, wherein said tube is connected to a fluid flow system, said helical duct having an inlet end and an outlet end with respect to the flow in said fluid flow system, said extension being shorter at said inlet end than at said outlet end.

4. A throttling means according to claim 1, wherein the axial length of said helical duct is at least five times the inner diameter of said tube.

5. A throttling means according to claim 1, wherein said tube is connected to a flush water supply system of a water closet.

6. A throttling means according to claim 5, wherein said supply system comprises a water level operated valve, said tube being connected to said supply system upstream of said valve.